United States Patent
Mrowiec et al.

(10) Patent No.: US 7,091,702 B2
(45) Date of Patent: Aug. 15, 2006

(54) DIGITAL REAL AND REACTIVE LOAD DIVISION CONTROL

(75) Inventors: David J. Mrowiec, Rockford, IL (US); William J. Peterson, Rockton, IL (US); Eric A. Henderson, Rockford, IL (US); Vijay K. Maddali, Rockford, IL (US); Wayne H. Oldenburg, Roscoe, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 59 days.

(21) Appl. No.: 11/005,826

(22) Filed: Dec. 7, 2004

(65) Prior Publication Data

US 2006/0119325 A1 Jun. 8, 2006

(51) Int. Cl.
*H02P 9/00* (2006.01)

(52) U.S. Cl. .............. 322/36; 322/37; 322/28; 290/2; 307/43

(58) Field of Classification Search ............. 290/2, 290/4 R, 4 A; 322/28, 36, 37; 307/43, 52, 307/80
See application file for complete search history.

(56) References Cited

U.S. PATENT DOCUMENTS

| | | | |
|---|---|---|---|
| 3,932,735 A * | 1/1976 | Giras | 700/287 |
| 4,320,306 A | 3/1982 | Kohga | |
| 4,321,645 A * | 3/1982 | Thom et al. | 361/63 |
| 4,403,292 A * | 9/1983 | Ejzak et al. | 700/297 |
| 4,752,697 A * | 6/1988 | Lyons et al. | 290/2 |
| 4,766,327 A | 8/1988 | Fox | |
| 5,077,485 A | 12/1991 | Rashid | |
| 5,390,068 A | 2/1995 | Schultz | |
| 5,606,245 A * | 2/1997 | Kirby | 322/8 |
| 5,686,766 A | 11/1997 | Tamechika | |
| 5,734,255 A * | 3/1998 | Thompson et al. | 322/7 |
| 5,745,356 A | 4/1998 | Tassitino | |
| 5,764,502 A * | 6/1998 | Morgan et al. | 363/65 |
| 6,066,897 A * | 5/2000 | Nakamura | 290/4 A |
| 6,522,030 B1 | 2/2003 | Wall | |
| 6,624,535 B1 | 9/2003 | Morrow | |
| 6,657,416 B1 * | 12/2003 | Kern et al. | 322/29 |
| 6,664,653 B1 | 12/2003 | Edelman | |

* cited by examiner

Primary Examiner—Nicholas Ponomarenko
(74) Attorney, Agent, or Firm—Carlson, Gaskey & Olds

(57) ABSTRACT

The present invention is a generator control system where each generator in the system has an associated controller. Each controller communicates generator data or information with the other controllers in the generator control system. Each of the controllers includes a digital signal processor for analyzing the generator signal from the associated generator and information from the other controllers in the generator control system. The controllers each compare their generator signal with a system average and adjust the associated generator until the generators all supply equal amounts of power to the system.

27 Claims, 2 Drawing Sheets

DIGITAL REAL AND REACTIVE LOAD DIVISION CONTROL

BACKGROUND OF THE INVENTION

The present invention is a system and method for controlling load division in multiple generator systems. More specifically the system utilizes digital signal processing to control load division.

Power systems with independent power supply units must be able to meet the highest load demands of the power system. To have the required capacity large power systems typically use multiple power generators arranged in parallel rather than one large generator. When using this method, the most efficient energy distribution occurs when the power supplied by each generator is equal. Variations in wiring, excitation characteristics and speed control mechanisms of the generators can cause the load on the generators to become unequal. Unequal loading creates unnecessary heat and mechanical wear on the generators, and results in inefficient operation and reduced reliability on heavily loaded generators. A control circuit is used to counter these problems and maintain even loading among the generators.

In order to equally distribute the power, known parallel power systems use a system of dedicated current transformers and breaker auxiliary contacts wired together to form a current transformer loop (CT loop). The CT loop generates a difference from average (DFA) current signal for each generator channel. Based upon the DFA current signal, further analog circuitry is used to determine the real and reactive components of the current for each generator channel. Once the real and reactive currents are found, the load division between the generators can be controlled. As long as the voltage of each generator is constant across all parallel channels, current alone is a reasonable parameter to use to control power. However, the current transformers require additional circuitry and hardware to determine the DFA and extract the real and reactive components of the current. The additional circuitry and hardware reduces the accuracy of the load division, adds expense and complexity, and reduces the system reliability. Also, impedance in the external current transformer loops can increase measurement error.

Thus, a system that eliminates the need for dedicated current transformers, and associated wiring, hardware, and circuitry is needed.

SUMMARY OF THE INVENTION

The present invention provides a generator control circuit where each generator in the generator control circuit has a controller and digital signal processor for analyzing and adjusting the operation of that generator compared with a system average.

Each generator in the system has a controller that includes a digital signal processor for analyzing system and generator current (i.e. for system protective functions). Each digital signal processor analyzes the same current and voltage signals from an associated generator to calculate generator load characteristics. For example, the generator load characteristics could comprise the real and reactive current components of the generator current as well as the real and reactive power delivered to the load. This information is shared with the digital signal processors for all of the other generators. Each controller also receives data relating to the other generators from the other controllers. Each of the controllers communicates with the other generator controllers via a communications link.

The digital signal processor of any given generator channel uses the data from the other generator controllers to calculate a system load characteristic. That channel's generator load characteristic is compared with the system load characteristic. For example, the real current/power component of the generator is compared with the average of the real current/power components of the other generators. Likewise, the controller compares the reactive current/power component of the generator with the average reactive current/power component of the other generators. Based upon the comparisons the controller analyzes and adjusts voltage control and speed control mechanisms of the generator. Each controller operates in the same manner to analyze the current/power associated with its generator and then makes the necessary adjustment to the generator until the current/power components among each generator are approximately equal.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
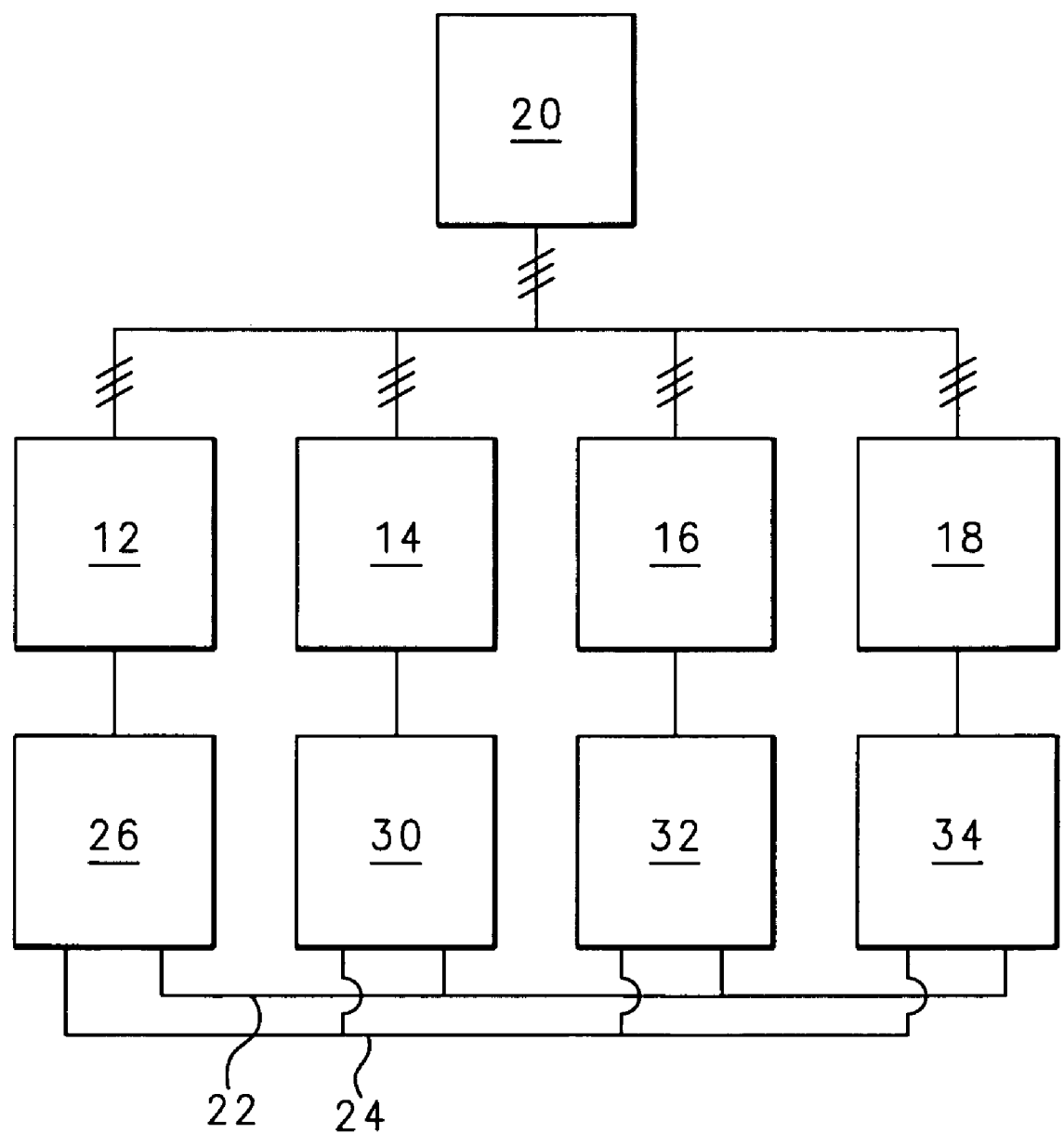
FIG. 1 illustrates a schematic of a generator control circuit of one embodiment of the present invention.

FIG. 1 illustrates a schematic of a generator control circuit 10 utilizing a load division control of the present invention. In the embodiment shown, there are four generators arranged in parallel with each other, more or less generators may be used as required by a system's power demands and/or power system configuration. The number of generators required is not necessarily dictated by load demand alone. Redundancy, isolation, generator physical size, number of engines etc. all are considered in determining a system configuration. One skilled in the art would know the proper number of generators required.

A first generator 12, a second generator 14, a third generator 16, and a fourth generator 18 all provide three phase power to a system load 20 comprised of one or many individual loads. All of the generators and their associated controllers shown as 12 and 26, 14 and 30, 16 and 32, 18 and 34 have similar circuit arrangements. The generator controllers 26, 30, 32, 34 are connected to communicate with each other via redundant communication links 22 and 24.

Figure 2:
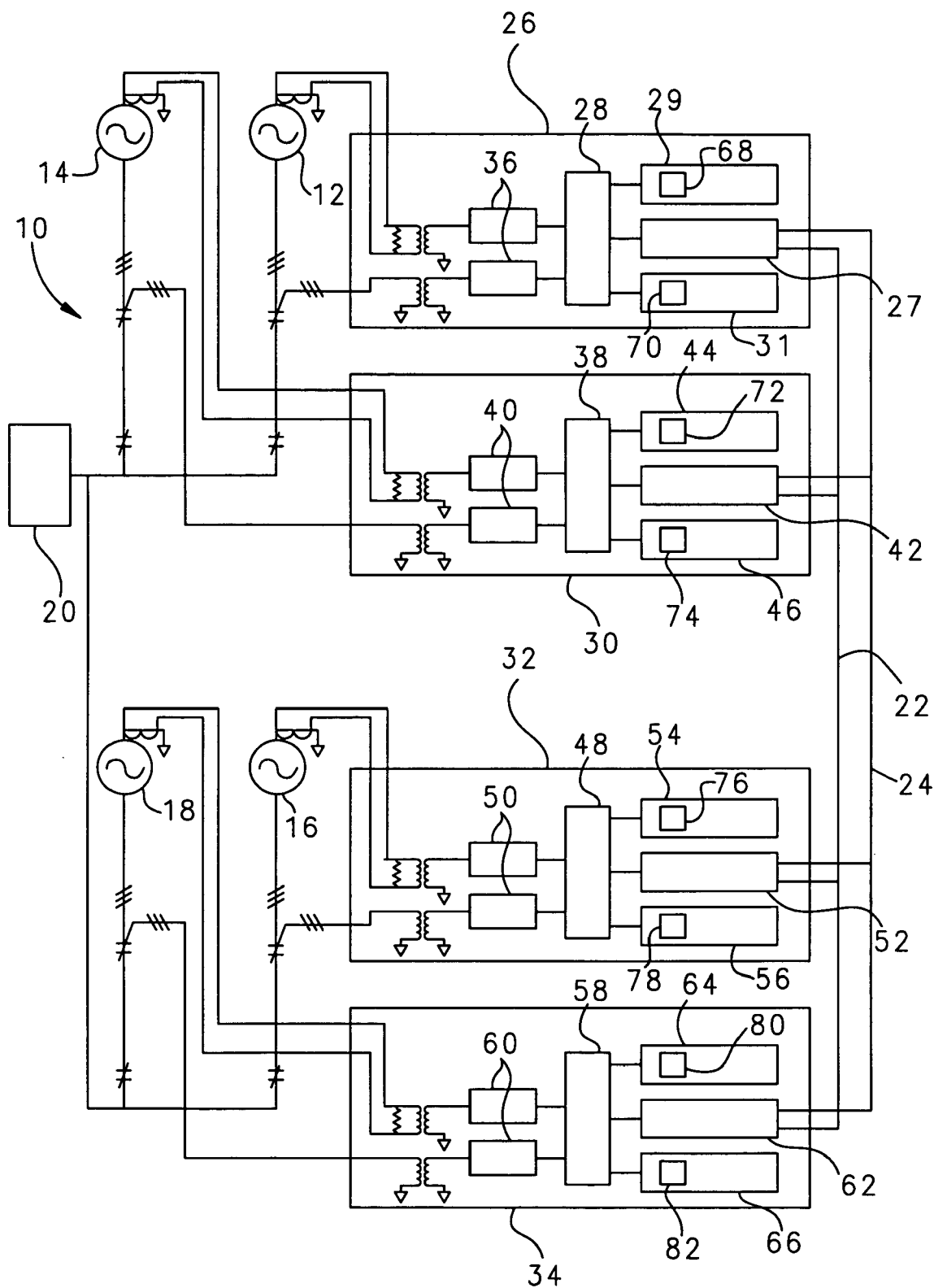
FIG. 2 is a schematic of the generator and controllers of one embodiment of the present invention.

As shown in FIG. 2, the first generator 12 has a first controller 26. The first controller 26 includes a first digital signal processor 28. The first digital signal processor 28 analyzes the current and voltage signals from the first generator 12 to determine a first generator load characteristics. The first generator load characteristic in this embodiment is the real and reactive components of the current/power. The first controller 26 may also include a first signal conditioning and filtering module 36 for filtering the signal from the first generator 12 prior to the first digital signal processor 28 analyzing the signals.

The second generator 14, third generator 16 and fourth generator 18 also have a similar controller associated with each individual generator 14, 16, 18. The information from the first controller 26 is shared with all of the other controllers through a first communications driver 27. The first controller 26 also receives data relating to the second generator 14 from a second controller 30 through a second communications driver 42, data relating to the third generator 16 from a third controller 32 through a third communications driver 52, and data relating to the fourth generator 18 from a fourth controller 34 through a fourth communications driver 62. Each of the controllers 26, 30, 32, 34 communicates with the other controllers via communications links 22 and 24. In this example the controllers are digital controllers. The communications between controllers may be via a daisy-chain digital communications bus or it may be via a series of dedicated communications links.

The first digital signal processor 28 also determines a system load characteristic. The system load characteristic is calculated by averaging the data of all the generators in the parallel system. A system real current/power component and a system reactive current/power component are determined. A first generator real and reactive current/power components are compared with the system real and reactive current/power components using the first digital signal processor 28. Based upon these comparisons, the first controller 26 may adjust a speed control mechanism 68 of the first generator 12 until the real and reactive current/power component of the first generator 12 is approximately equal with the system average real or reactive current/power component. Constant updating of the system characteristics is necessary to balance out the first generator's load characteristics. Using a first frequency control 29, which is incorporated into the first controller 26, can vary the speed control mechanism 68.

Additionally, the first controller 26 compares the real and reactive generator current/power component with the system real and reactive current/power component using the first digital signal processor 28. Based upon the comparisons the first controller 26 may adjust a voltage control mechanism 70 by use of a first voltage control 31 until the real and reactive current/power or the total power of the first generator 12 is equal to the other generators 14, 16, 18. Constant updating of the system characteristics is necessary to balance out the first generator's load characteristics. The first voltage control 31 can be incorporated into the first controller 26.

In the same manner the second controller 30 controls the second generator 14 using a second digital signal processor 38. The second controller 30 may include a second signal conditioning and filtering module 40 for filtering the signals from the second generator 14 prior to the second digital signal processor 38 analyzing the signals. A second communications driver 42 receives information from the first controller 26, third controller 32 and fourth controller 34. The second digital signal processor 38 compares the second generator characteristics with the system characteristics as described above. The second frequency control 44 is used to vary a speed control mechanism 72 as needed. Likewise, a second voltage control 46 is used to vary a second voltage control mechanism 74 as needed.

The third controller 32 controls the third generator 16 in the same manner using a third digital signal processor 48. The third controller 32 may include a third signal conditioning and filtering module 50 for filtering the signals from the third generator 16 prior to the third digital signal processor 48 analyzing the signals. A third communications driver 52 receives information from the first controller 26, second controller 30 and fourth controller 34. The third digital signal processor 48 compares third generator load characteristics from the third generator 16 with the system load characteristics as described above. A third frequency control 54 is used to vary a speed control mechanism 76 as needed. Likewise, a third voltage control 56 is used to vary a third voltage control mechanism 78 as needed.

The fourth controller 34 controls the fourth generator 18 using a fourth digital signal processor 58. The fourth controller 34 may include a fourth signal conditioning and filtering module 60 for filtering the signals from the fourth generator 18 prior to the fourth digital signal processor 58 analyzing the signals. A fourth communications driver 62 receives information from the first controller 26, second controller 30 and third controller 32. The fourth digital signal processor 58 compares fourth generator load characteristics from the fourth generator 18 with the system load characteristics as described above. A fourth frequency control 64 is used to vary a speed control mechanism 80 as needed. A fourth voltage control 66 is used to vary a fourth voltage control mechanism 82 as needed.

As described above, each digital signal processor 28, 38, 48, 58 in the system analyzes the current/power of the associated generator 12, 14, 16, 18 to determine individual generator load characteristics. Each digital signal processor 28, 38, 48, 58 also determines system characteristics using data received from the other generator controllers 26, 30, 32, 34. Each digital signal processor 28, 38, 48, 58 compares the individual generator load characteristics to the system load characteristics. The controllers 26, 30, 32, 34 then make necessary adjustments to each corresponding generator 12, 14, 16, 18 until each generator characteristics is approximately equal/balanced with the system load characteristics. The digital signal processors 28, 38, 48, 58 can be any general purpose processor or programmable digital device (like a gate array, ASIC, etc.) with sufficient throughput capacity to do real time data calculation and control.

In one example, each digital signal processor 28, 38, 48, 58 uses a Fourier series method to determine the sine and cosine coefficients for the phase voltages and currents. The sine and cosine coefficients are then used to calculate real and reactive power for each phase. Methods of using sine and cosine coefficients to calculate real and reactive power are known to those skilled in the art.

The communication links 22, 24 eliminate the need for the external hardware that makes up the current transformer (CT) loops. Because CT loops are no longer used there need not be as many auxiliary contacts on breakers for each generator channel. The elimination of the CT loops also increases the accuracy of the system controls because wiring impedance induced errors and CT signal conditioning and demodulation errors are eliminated. The elimination of the CT loops reduces the number of LRUs (Line Replaceable Units) in a system, lowers the cost to manufacture/wire the system and decreases the system weight making the system easier to use in environments where weight and space are limited, such as in aircraft.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A generator control system comprising:
   a multiple of generators each having a controller for controlling at least one generator load characteristic of an associated generator;
   a digital signal processor within each controller for determining said at least one generator load characteristic; and a communications link between all controllers for communicating said at least one generator characteristic to all controllers wherein each controller compares said at least one generator load characteristic to at least one system load characteristic and generates a control signal to adjust a control mechanism of the associated generator when said at least one generator load characteristic varies from said at least one system load characteristic by a predetermined amount.

2. The generator control system of claim 1, wherein said communications link is an interface between each of said controllers.

3. The generator control system of claim 2, wherein each of said controllers includes a communications driver.

4. The generator control system of claim 1, wherein said communications link is connected to a digital signal bus.

5. The generator control system of claim 1, wherein said controllers are digital controllers.

6. The generator control system of claim 1, wherein said at least one system load characteristic is an average system current and said at least one generator characteristic is a generator current of the associated generator.

7. The generator control system of claim 6, wherein said average system current includes an average real current and an average reactive current and said generator current includes a real current and a reactive current.

8. The generator control system of claim 7, wherein said control mechanism is a frequency control circuit and said controller generates said control signal to adjust an associated generator speed when said real current varies from said average real current by the predetermined amount.

9. The generator control system of claim 7, wherein said control mechanism is a frequency control circuit and said controller generates said control signal to adjust an associated generator speed when said reactive current varies from said average reactive current by the predetermined amount.

10. The generator control system of claim 7, wherein said control mechanism is a voltage control circuit and said controller generates said control signal to adjust an associated generator voltage when said reactive current varies from said average reactive current by the predetermined amount.

11. The generator control system of claim 7, wherein said control mechanism is a voltage control circuit and said controller generates said control signal to adjust an associated generator voltage when said real current varies from said average real current by the predetermined amount.

12. The generator control system of claim 1, wherein said at least one system load characteristic is an average power of the system and said at least one generator load characteristic is a generator power of the associated generator.

13. The generator control system of claim 12, wherein said control mechanism includes a speed control mechanism and a voltage control mechanism and said controller generates said control signal to adjust at least one of an associated generator frequency and associated generator voltage when said generator power varies from said average power by the predetermined amount by controlling said speed control mechanism by varying said associated generator frequency with a frequency control circuit and by controlling said voltage control mechanism by varying said associated generator voltage with a voltage control circuit.

14. The generator control system of claim 13, wherein said frequency and said voltage control mechanisms are increased and decreased as necessary.

15. A method of generator load control comprising:
a) providing a multiple of generators each having a digital signal processor;
b) calculating at least one generator load characteristic for each generator with the digital signal processor associated with the generator;
c) calculating at least one system load characteristic for all generators with the digital signal processor;
d) comparing the generator load characteristic and the system load characteristic using the digital signal processor; and
e) adjusting a generator control if the generator load characteristic varies from the system load characteristic by a predetermined amount.

16. The method of claim 15, wherein said step b) includes determining a real current and a reactive current for each generator and said step c) includes determining an average real current and an average reactive current of all of the generators.

17. The method of claim 16, wherein said step e) includes adjusting a generator voltage with a voltage control circuit.

18. The method of claim 16, wherein said step e) includes adjusting a generator speed with a frequency control circuit.

19. The method of claim 15, wherein the at least one generator characteristic comprises a generator power signal and wherein said step b) includes determining a real power and reactive power of the generator power signal; and wherein the at least one system load characteristic comprises a system power signal said step c) includes determining an average real power and an average reactive power of the system power signal.

20. The method of claim 19 wherein the generator power signal comprises a plurality of power phases and wherein b) includes determining a real power and a reactive power for each power phase of the generator power signal; and wherein the system power signal comprises a plurality of power phases and wherein said step c) includes determining the average real power and the average reactive power for each power phase of the system power signal.

21. The method of claim 20 wherein said step d) includes comparing the real power and average real power for one of the power phases.

22. The method of claim 21, wherein the generator control includes a voltage control mechanism and wherein said step e) includes varying the voltage control mechanism with a voltage control circuit.

23. The method of claim 21, wherein the generator control includes a speed control mechanism and wherein said step e) includes varying the speed control mechanism with a frequency control circuit.

24. The method of claim 20, wherein said step d) includes comparing the real and reactive components for all of the power phases.

25. The method of claim 15, wherein said step e) includes adjusting the generator control by varying at least one of generator voltage and generator speed until the generator characteristic is approximately equal to the system characteristic.

26. The generator control system of claim 1, wherein said multiple of generators are at least two electrical power generation channels.

27. The generator control system of claim 1, wherein said digital signal processor is a programmable digital device having the capacity to perform real time data calculation and control.

* * * * *